United States Patent Office 3,558,333
Patented Jan. 26, 1971

3,558,333
PHOTOCHROMIC TITANATE MATERIAL AND A METHOD FOR MAKING THE SAME
Malcolm D. Beals, Fanwood, and Leon Merker, Metuchen, N.J., assignors to National Lead Company, New York, N.Y., a corporation of New Jersey
No Drawing. Filed Feb. 21, 1968, Ser. No. 707,315
Int. Cl. C04b 35/00
U.S. Cl. 106—42                       11 Claims

ABSTRACT OF THE DISCLOSURE

This invention describes a new and novel composition of matter which exhibits photochromic properties when said material is exposed alternately to a blue light and yellow light. The composition of matter comprises strontium titanate or calcium titanate containing small quantities of either $MoO_3$ or $WO_3$ plus $Fe_2O_3$, NiO, $Co_2O_3$ or $MnO_2$. The composition may be prepared either as powdered or compressed multicrystalline material or as a massive monocrystalline body.

BACKGROUND OF THE INVENTION

The term "photochromic properties" is meant to include the ability of a substance of material to change color when the material is exposed to blue light and then revert back to its original color when exposed to a yellow light.

Photochromic materials are known and have been used as the active ingredients in such articles as data storage systems, reflectants for incident high-intensity radiation, photo-chemical printing and the like.

A new and novel composition of matter has been produced by the instant invention which is superior to previously known photochromic materials because of its fast response and high contrast.

SUMMARY OF THE INVENTION

According to the instant invention the following composition of matter exhibits photochromic properties when exposed to a blue light source with wave lengths which fall within the region of 300 m$\mu$ to 460 m$\mu$ and return to its normal color when exposed to a yellow light source within the range of 500 m$\mu$ to 750 m$\mu$.

Strontium titanate or calcium titanate containing a Group VIb metal oxide selected from the group consisting of $MoO_3$ and $WO_3$ and a metal oxide selected from the group consisting of $FeO_2O_3$, NiO, $Co_2O_3$ and $MnO_2$ and mixtures thereof, said Group VIb metal oxide and said metal oxide both being present in amount from 0.001% to 0.5%, preferably from 0.005% to 0.2%, the percentages being based on the weight of said strontium titanate or calcium titanate.

The composition of matter may be either in the form of a massive single crystal or in the form of powdered or compressed multicrystalline material. In preparing the powdered or compressed material, the mixture must be heated to 1000° C. to 1600° C. to form an interreaction or solid solution of the mixture.

When the compositions contain amounts of $MoO_3$ or $WO_3$ above about 0.1%, the color may become dark and therefore its photochromic effect may appear to be lessened. In such cases it has been found to be desirable to add a small amount of $Al_2O_3$ to the composition. When the $Al_2O_3$ is present, the color of the composition is lighter than that obtained without the presence of $Al_2O_3$. The amount of $Al_2O_3$ to be used is from 0.01% to 0.1%.

DESCRIPTION OF THE PREFERRED EMBODIMENT

The strontium titanate and/or the calcium titanate powdered material used in the instant invention is substantially free from objectionable or incompatible impurities which detrimentally affect the final product. The starting material should be finely divided and fairly uniform in size. Such a material may be formed by many means, such as reacting at elevated temperatures $TiO_2$ and SrO or CaO, or by reacting reagent grade titanium oxalate with strontium chloride or calcium chloride to form strontium titanium oxalate or calcium titanium oxalate. After thoroughly washing, the strontium, or calcium titanium oxalate is then heated to at least 500° C. to remove the oxalate values and to produce the strontium or calcium titanate of high purity. This particular procedure is described in more detail in U.S. Pat. No. 2,628,156.

As stated previously, the composition of the instant invention may be prepared in powdered or compressed multicrystalline form or as massive single crystals. In preparing the composition in multicrystalline form the following procedure may be used:

The substantially pure strontium titanate or calcium titanate powdered starting material is thoroughly admixed with 0.001% to 0.5% of $MoO_3$ or $WO_3$ plus 0.001% to 0.5% of $Fe_2O_3$, NiO, $Co_2O_3$ or $MnO_2$. If desired the powdered mixture may be formed into compressed compacts, such as pellets, and the like. This mixture either in powdered or compressed form is then heated to a temperature from 1000° C. to 1600° C. to sinter the mixture and to form a solid solution of the mixture. After the composition has been formed, the sintered mass may then be ground if desired. This powdered or compressed composition when exposed alternately to blue and yellow light exhibits good photochromic properties.

In order to prepare massive single crystals, the strontium titanate or calcium titanate powdered starting material is admixed with the $MoO_3$ or $WO_3$ and the $Fe_2O_3$, NiO, $Co_2O_3$ or $MnO_2$ as described above. The mixture is fed into an oxygen-hydrogen flame in order to melt the composition to form a single crystal boule. These boules were formed at temperatures between 2080° C. and 2150° C. Details of the method used to form the boules are described in U.S. Pat. No. 2,628,156 and U.S. Pat. No. 2,985,520.

After the boules have been formed and cooled, they are oxidized at 650° C. to 1700° C. to form a colorless single crystal. These massive single crystals also exhibit good photochromic properties when subjected to blue and yellow light.

The following examples are presented to describe in more detail the instant invention:

EXAMPLE 1

Preparation of powdered composition

Substantially pure powdered strontium titanate which was prepared by heating strontium titanium oxalate to drive off the oxalate values was used as the starting material. 100 grams of this strontium titanate were mixed thoroughly with .01 gram of powdered $MoO_3$ and .01 gram of powdered $Fe_2O_3$. The mixture was compressed into a pellet and heated to 1400° C. for 24 hours to form a solid solution composition.

After cooling the powdered composition was exposed alternately to a blue and yellow light where it exhibited good photochromic properties.

EXAMPLES 2–4

The procedure of Example 1 was repeated except that varying amounts of $MoO_3$ and $Fe_2O_3$, NiO and $Co_2O_3$ were substituted for those used in Example 1. In all cases the compositions exhibited good photochromic properties when exposed to blue and yellow light. The details of operation and compositions employed are recorded in Table I along with those of Example 1.

EXAMPLES 5–6

These examples are presented to show the effect of adding only one of the necessary oxides, i.e., either $MoO_3$ or $WO_3$ or the metal oxides of $Fe_2O_3$, NiO, $Co_2O_3$ or $MnO_2$, not both. In Example 5, 0.5 gram of $MoO_3$ was added as the only agent to 100 grams of the strontium titanate. In Example 6 only 0.5 gram of $Fe_2O_3$ was added. Neither of these products possessed a satisfactory photochromic effect when exposed alternately to blue and yellow light.

EXAMPLES 7–10

In these examples the procedure of Example 1 was repeated except that calcium titanate was used instead of strontium titanate. The calcium titanate used was prepared according to the process described in U.S. Pat. No. 2,751,279. The multicrystalline compositions of the instant examples contained varying amounts of $MoO_3$ and $Fe_2O_3$, NiO or $Co_2O_3$.

The operational details and results obtained are recorded in Table I.

In Example 7 the sintered multicrystalline compositions of calcium titanate containing 0.05% $MoO_3$ and 0.05% $Fe_2O_3$ was thoroughly ground. One portion of the ground material was admixed into a polyvinyl acetate latex emulsion at 0.5 part of powder to 2.5 parts of vehicle. The paint composition was spread onto a glass surface and was allowed to dry. The dried paint coating exhibited satisfactory photochromic properties when alternately exposed to blue and yellow lights.

The powdered composition was also admixed into a glass frit composition at 75 parts calcium titanate and 25 parts glass frit. The glass frit has the following composition: 53% PbO, 2% $B_2O_3$, 32% $SiO_2$, 4% CdO, 3% $Na_2O$, 4% $TiO_2$ and 2% $Li_2O$.

The calcium titanate glass frit mixture was then placed onto a glass surface and fired at 620° C. for 1 hour to mature the coating. Again the fired coating had satisfactory photochromic properties when alternately exposed to a blue and yellow light.

EXAMPLES 11–17

In these examples five massive monocrystalline boules of strontium titanate and two of calcium titanate were produced. In Examples 11–13 the strontium titanate boules contained $MoO_3$ plus $Fe_2O_3$, NiO or $MnO_2$. In Examples 14 and 15 the strontium titanate boules contained $WO_3$ plus $Fe_2O_3$ or NiO. The calcium titanate boules in Examples 16 and 17 contained $MoO_3$ plus $Fe_2O_3$ or NiO.

These boules were prepared by passing the powdered mixture through an oxy-hydrogen flame onto a pedestal held within the oxidizing portion of the flame. The powdered mixture was melted and was crystallized onto the pedestal as a single crystal or boule. The boule when formed was dark in color but upon annealing the boule in an oxidizing atmosphere at 1400°+400° C., it produced a substantially colorless single crystal. A more detailed description is presented in U.S. Pat. No. 2,628,156 and U.S. Pat. No. 2,985,520.

All of these boules exhibited good photochromic properties when exposed alternately to blue and yellow light.

The operational details and results of these examples are recorded in Table II.

EXAMPLES 18–19

In these Examples $Al_2O_3$ was added to the compositions in order to reduce the deep coloration of the boules when larger amounts of $MoO_3$ were employed. In Example 18 $Al_2O_3$ was added to strontium titanate containing $MoO_3 + Co_2O_3$. In Example 19 $Al_2O_3$ was added to calcium titanate containing $MoO_3$ and $Fe_2O_3$.

TABLE I.—MULTICRYSTALLINE POWDERED MATERIALS

| | Example No. | | | | | | | | | |
|---|---|---|---|---|---|---|---|---|---|---|
| | 1 | 2 | 3 | 4 | 5 | 6 | 7 | 8 | 9 | 10 |
| | Strontium titanate | | | | | | Calcium titanate | | | |
| Metal oxides used | $MoO_3$ .01% $Fe_2O_3$ .01% | $MoO_3$ .05% $Fe_2O_3$ .05% | $MoO_3$ .05% NiO .05% | $MoO_3$ .05% $Co_2O_3$ .05% | $MoO_3$ .05% None | None $Fe_2O_3$ .05% | $MoO_3$ .05% $Fe_2O_3$ .05% | $MoO_3$ .10% $Fe_2O_3$ 0.05% | $MoO_3$ .05% NiO .05% | $MoO_3$ .10% $Co_2O_3$ .05% |
| Temperature employed, ° C | 1,400 | 1,400 | 1,400 | 1,400 | 1,400 | 1,400 | 1,400 | 1,400 | 1,400 | 1,400 |
| Time of heat treatment, hours | 24 | 24 | 24 | 24 | 24 | 24 | 24 | 24 | 24 | 24 |
| Photochromic properties | (1) | (1) | (1) | (1) | (2) | (2) | (1) | (1) | (1) | (1) |

1 Satisfactory.
2 Not satisfactory.

TABLE II.—SINGLE CRYSTAL BOULES

| | 11 | 12 | 13 | 14 | 15 | 16 | 17 | 18 | 19 |
|---|---|---|---|---|---|---|---|---|---|
| | Strontium titanate | | | | | Calcium titanate | | Strontium titanate | Calcium titanate |
| Metal oxides used | $MoO_3$ 0.08% $Fe_2O_3$ 0.02% | $MoO_3$ 0.08% NiO 0.02% | $MoO_3$ 0.2% $MnO_2$ 0.02% | $WO_3$ 0.05% $Fe_2O_3$ 0.03% | $WO_3$ 0.05% NiO 0.03% | $MoO_3$ 0.03% $Fe_2O_3$ 0.02% | $MoO_3$ 0.2% NiO 0.03% | $MoO_3$ 0.2% $CoO_3$ 0.02% $Al_2O_3$ 0.03% | $MoO_3$ 0.2% $Fe_2O_3$ 0.03% $Al_2O_3$ 0.05% |
| Annealing temperature employed, ° C | 1,400+400 | 1,400+400 | 1,400+400 | 1,400+400 | 1,400+400 | 1,400+400 | 1,400+400 | 1,400+400 | 1,400+400 |
| Time of heat treatment, hours | 12+12 | 12+12 | 12+12 | 12+12 | 12+12 | 12+12 | 12+12 | 12+12 | 12+12 |
| Photochromic properties | (1) | (1) | (1) | (1) | (1) | (1) | (1) | (1) | (1) |

1 Satisfactory.

While this invention has been described and illustrated by the examples shown, it is not intended to be strictly limited thereto, and other variations and modifications may be employed within the scope of the following claims.

We claim:

1. A composition of matter consisting essentially of (a) a compound selected from the group consisting of strontium titanate and calcium titanate (b) a Group VI*b* metal oxide selected from the group consisting of $MoO_3$ and $WO_3$ and (c) a transition metal oxide selected from the group consisting of $FE_2O_3$, NiO, $Co_2O_3$ and $MnO_2$, each of said Group VI*b* metal oxide and said transition metal oxide being present in said titanate compound in amount from 0.001% to 0.5%, the percentages being based on the weight of said titanate compound.

2. Composition according to claim 1 in which the titanate compound is strontium titanate.

3. Composition according to claim 1 in which the titantae compound is calcium titanate.

4. Composition according to claim 1 in which the Group VI$b$ metal oxide is $MoO_3$.

5. Composition according to claim 1 in which the Group VI$b$ metal oxide is $WO_3$.

6. Composition according to claim 1 in which the Group VI$b$ metal oxide is $MoO_3$ and the transition metal oxide is $Fe_2O_3$.

7. Process for preparing a composition of matter consisting essentially of (a) a compound selected from the group consisting of strontium titanate and calcium titanate (b) a Group VI$b$ metal oxide selected from the group consisting of $MoO_3$ and $WO_3$ and (c) a transition metal oxide selected from the group consisting of $Fe_2O_3$, NiO, $Co_2O_3$ and $MnO_2$, each of said Group VI$b$ metal oxide and said transition metal oxide being present in said titanate compound in amount from 0.001% to 0.5%, the percentages being based on the weight of said titanate compound; said process which comprises thoroughly admixing said titanate compound and said transition metal oxide and heating the mixture at a temperature from 1000° C. to 1600° C. to sinter the mixture to form a solid solution of said mixture.

8. A multicrystalline sintered mass consisting essentially of the composition of claim 1.

9. A single crystal boule consisting essentially of the composition of claim 1.

10. Composition according to claim 1 in which each of said Group VI$b$ metal oxide and said transition metal oxide are present in said titanate compound in amount from 0.005% to 0.2%.

11. Process according to claim 7 in which each of said Group VI$b$ metal oxide and said transition metal oxide are present in said titanate compound in amount from 0.005% to 0.2%.

References Cited

UNITED STATES PATENTS

| 1,952,255 | 3/1934  | Jaeger et al. | 106—42   |
| 2,685,525 | 8/1954  | Merker        | 106—42   |
| 2,723,915 | 11/1955 | Merker        | 106—42   |
| 2,985,520 | 3/1961  | Merker        | 106—42X  |
| 3,214,283 | 10/1965 | Chopoorian    | 252—301.4X |

OTHER REFERENCES

Exelby, R. and Grinther, R.; "Phototropy (or Photochromism)" in Chem. Rev., 65, London 1965 pp. 247 and 257–258.

TOBIAS E. LEVOW, Primary Examiner

W. R. SATTERFIELD, Assistant Examiner

U.S. Cl. X.R.

23—301; 106—47; 252—301.4, 301.5